United States Patent
Dequina et al.

(10) Patent No.: US 6,940,262 B2
(45) Date of Patent: Sep. 6, 2005

(54) PWM-BASED DC-DC CONVERTER WITH ASSURED DEAD TIME CONTROL EXHIBITING NO SHOOT-THROUGH CURRENT AND INDEPENDENT OF TYPE OF FET USED

(75) Inventors: Noel Dequina, Bridgewater, NJ (US); Donald R. Preslar, Hillsborough, NJ (US); Paul K. Sferrazza, Branchburg, NJ (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 10/725,764

(22) Filed: Dec. 2, 2003

(65) Prior Publication Data

US 2004/0130307 A1 Jul. 8, 2004

Related U.S. Application Data

(60) Provisional application No. 60/437,180, filed on Dec. 31, 2002.

(51) Int. Cl.[7] .............................................. G05F 1/618
(52) U.S. Cl. ....................... 323/284; 327/108; 327/398
(58) Field of Search ................................ 323/224, 282, 323/284, 285; 327/108, 112, 389, 394, 398, 399

(56) References Cited

U.S. PATENT DOCUMENTS

| | | | | |
|---|---|---|---|---|
| 5,408,150 A | | 4/1995 | Wilcox | 327/108 |
| 5,930,132 A | | 7/1999 | Watanabe et al. | 363/56 |
| 6,037,720 A | * | 3/2000 | Wong et al. | 315/291 |
| 6,107,844 A | * | 8/2000 | Berg et al. | 327/110 |
| 6,307,409 B1 | * | 10/2001 | Wrathall | 327/112 |
| 6,377,032 B1 | * | 4/2002 | Andruzzi et al. | 323/224 |
| 6,459,325 B1 | * | 10/2002 | Hall et al. | 327/391 |
| 6,674,268 B2 | * | 1/2004 | Rutter et al. | 323/224 |
| 6,734,656 B2 | * | 5/2004 | Miller et al. | 323/284 |

* cited by examiner

Primary Examiner—Gary L Laxton
(74) Attorney, Agent, or Firm—Allen, Dyer, Doppelt, Milbrath & Gilchrist, P.A.

(57) ABSTRACT

A control circuit for a switch mode DC-DC converter contains an arrangement of monitored LGATE, UGATE and PHASE node condition threshold detectors, outputs of which are processed in accordance with a switching control operator to ensure that each of an upper FET (UFET) and a lower FET (LFET) is completely turned off before the other FET begins conduction, thereby maintaining a dead time that exhibits no shoot-through current and is independent of the type of switching FET.

8 Claims, 5 Drawing Sheets

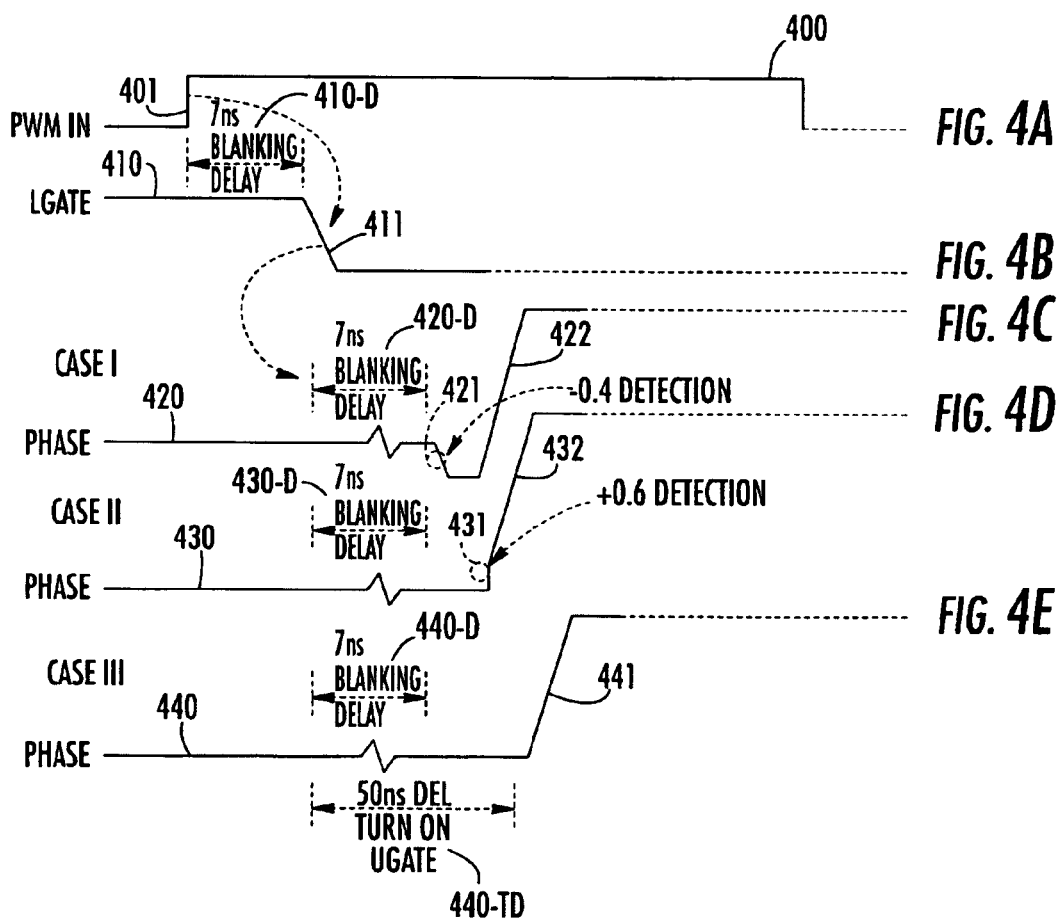

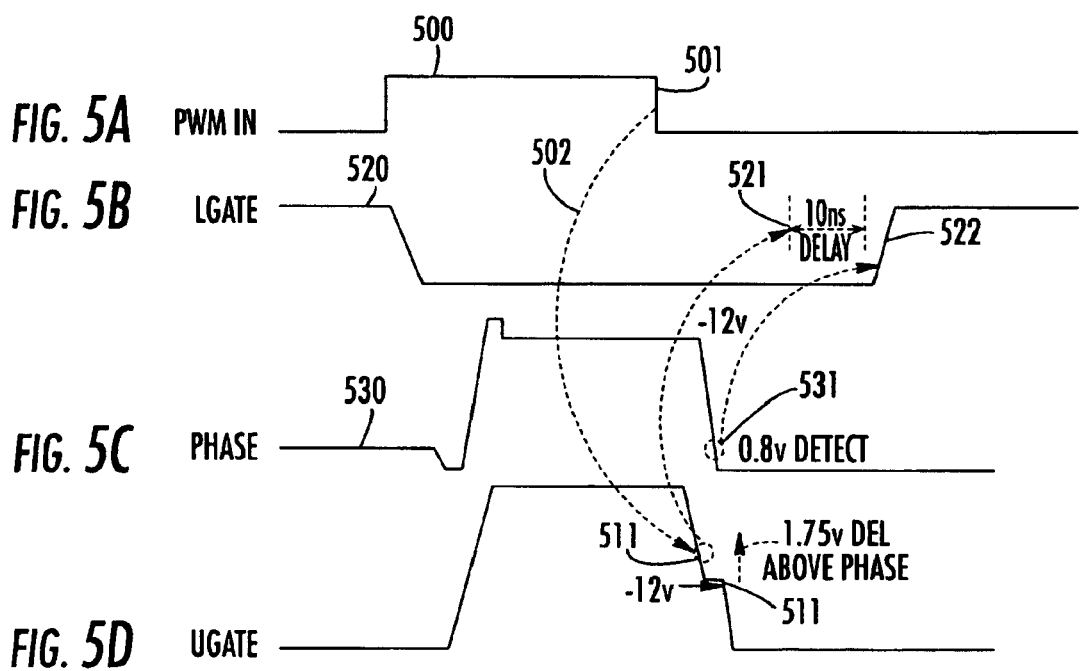

PWM-BASED DC-DC CONVERTER WITH ASSURED DEAD TIME CONTROL EXHIBITING NO SHOOT-THROUGH CURRENT AND INDEPENDENT OF TYPE OF FET USED

CROSS-REFERENCE TO RELATED APPLICATION

The Present Application claims the benefit of co-pending U.S. Patent Application Ser. No. 60/437,180 filed Dec. 31, 2002, by N. Dequina et al, entitled: "Assured Dead Time Control Exhibiting No Shoot-Through Current and Independent of Type of FET Used," assigned to the assignee of the present application and the disclosure of which is incorporated herein.

FIELD OF THE INVENTION

The present invention relates in general to DC power supply circuits and components therefor, and is particularly directed to a new and improved pulse width modulator (PWM)-based DC-DC converter circuit, that is configured to maintain a fixed dead time that exhibits no shoot-through current and is independent of the type of switching FET used.

BACKGROUND OF THE INVENTION

Electrical power for an integrated circuit (IC) is typically supplied by one or more direct current (battery) power sources, such as a pulse width modulation (PWM)-based, DC-DC converter. As diagrammatically illustrated in FIG. 1, this type of converter contains a PWM signal generator 1 that supplies a synchronous PWM signal to a switching circuit driver 2. Such a PWM-based converter architecture is ideally intended to deliver constant energy to an output node regardless of the input voltage. To this end, the switching circuit driver 2 controls the on-time and off-time of a pair of electronic power switching devices 3 and 4 (typically external NFETs) connected between power supply rails Vin and ground (GND). A common or PHASE node 5 between the two FETs is coupled through an inductor 6 to a load reservoir capacitor 7, with the connection 8 between inductor 6 and capacitor 7 serving as an output node from which a desired (regulated) DC output voltage is applied to load 9.

The circuit of FIG. 1 typically operates in the manner shown in the set of timing diagrams of FIG. 2. In particular, in response to a positive-going transition 201 in a PWM waveform 200, the FET driver 2 turns off the LGATE drive to the lower FET 4. In response to the LGATE voltage 210 dropping to a prescribed threshold detection value 211 (e.g., 1.5 V), the driver control circuitry 2 applies a UGATE turn on voltage 220 which exhibits a positive excursion 221 to the gate drive input of the upper FET 3. The voltage at the PHASE node represented by signal trace 230 substantially follows the upper gate voltage signal and is monitored to control the turn-on of the LFET 4.

In particular, in response to a negative-going transition 202 in the PWM signal 200, the UGATE signal undergoes a high to low transition 222, turning off the UFET 3. Then, in response to the associated excursion 232 in the PHASE node voltage 230 dropping to a predetermined threshold detection value 233, the LGATE voltage is transitioned high, as shown by the positive-going excursion 212 of the LGATE signal 210, turning on the LFET 4. FIG. 2 also shows the application of a tristate or power-on reset signal 240 having rising edge 241 to turn off the lower gate drive signal at 213 and falling edge 242 to turn on the lower gate signal at 214.

In the course of terminating the on-time of each FET switch, it is desirable to provide a time interval during which both controlled switches (UFET 3 and LFET 4) are guaranteed to be off. This time interval, known as 'dead time', allows for the resetting of magnetic circuit components within the power supply. Namely, modulation of the PWM generator's duty cycle is limited, in order to insure that there always exists a dead time period. This also serves to prevent efficiency degradation, which occurs when both the upper and lower FETs intermittently conduct during a common time interval. This unwanted intermittent conduction problem results from insufficient dead time before the other FET begins conduction. Among factors that contribute to this phenomenon are the type of FET being used and board parasitic layout.

SUMMARY OF THE INVENTION

In accordance with the present invention the above assured 'dead time' objective is successfully addressed by a switching mode-based DC-DC converter signal processing architecture, which is configured to guarantee that each of the upper and lower FETs of a switched FET pair is completely turned off before its complementary device (the other FET of the switched pair) begins conduction, irrespective of the type of FET being used. As will be described, the invention employs prescribed voltage threshold and time-out (delay) detectors that are selectively coupled to monitor LOWER GATE, UPPER GATE and PHASE nodes of the switching FETs. These monitored values are processed in a set of combinational logic to generate control signals for establishing drive signals that are used to turn the upper and lower FETS on and off.

To this end, subsequent to a prescribed blanking delay following a low-to-high transition in the PWM signal, the lower FET's gate drive signal is caused to transition from high-to-low, turning the LFET off. Using this high-to-low transition of the LFET signal as detected by an LGATE detector as a reference, the PHASE node voltage is monitored by phase node detectors for one of a set of predetermined conditions in order to determine when to turn on the UFET. The invention addresses three separate cases that may initiate turn on of the UFET by way of the UGATE signal. For each action, there is a built-in precedent blanking delay following detection of the high-to-low transition of the LGATE signal.

A first case corresponds to the polarity of the voltage at the PHASE node going negative after the LGATE node transitions from high-to-low. In response to the LGATE voltage going low, the voltage at the PHASE node is monitored to determine whether it has reached a prescribed negative polarity voltage (e.g., −0.4 V). In particular, following a blanking delay, if the phase voltage at the PHASE node drops below the −0.4 V threshold, combinational logic triggers a low-to-high to transition on the UGATE, which causes the phase node voltage to go high.

The second case is associated with a reverse current condition, and corresponds to the polarity of the voltage at the PHASE node going positive subsequent to the LGATE node transitioning from high-to-low. For this purpose, if Case I is not observed, namely, if the −0.4 V threshold is not reached following the high-to-low transition of the LGATE voltage, combinational logic looks to see whether a prescribed positive threshold (e.g., +0.6 V) has been reached. If so, the combinational logic will trigger a low-to-high transition of the UGATE signal, which causes the phase node voltage to go high.

The third case associated with a no load condition, corresponds to the elapse of a prescribed time-out without either of the positive and negative polarity thresholds having been reached at the phase node. Namely, if neither the −0.4 V and +0.6 V thresholds is observed at the phase node within a prescribed time out window after the high-to-low transition in the LGATE signal, the combination logic triggers a low-to-high transition of the UGATE signal so that the voltage at the phase node goes high.

A comparison of the LGATE turn-off transition with the respective UGATE turn-on transitions represented by the phase node voltage traces reveals no overlap between the terminal end of the conduction interval for the LFET and the initial portion of the conduction interval for the UFET. Therefore, there is no simultaneous conduction of these two FETS between the time of turn-off of the LFET and the time of turn-on of the UFET in response to a low-to-high transition in the PWM signal.

The controlled turn-off of the UFET and the subsequent turn-on of the LFET after a high-to-low transition in the PWM signal proceeds as follows. Turn-off of the UGATE drive to the UFET is initiated by a high-to-low transition in the PWM waveform. Thereafter, the PHASE node and UGATE node are monitored by associated threshold circuits within a dead time controller. Specifically, in response to the UGATE voltage dropping to a voltage level that is a prescribed value above the phase voltage (e.g., on the order of 1.75 V above the PHASE voltage (112V)), a prescribed time out (e.g., 10 ns) is triggered, whereupon the LGATE signal is transitioned from low-to-high, turning on the LFET.

Alternatively, if the level of the PHASE node voltage reaches a predetermined threshold (e.g., on the order of 0.8 V), a low-to-high transition of the LGATE voltage is initiated. As is the case for a low-to-high transition of the PWM signal, a comparison of the LGATE turn-on transition with the UGATE turn-off transition reveals that there is no overlap between the terminal end of the conduction interval for the UFET and the initial portion of the conduction interval for the LFET, so that simultaneous conduction of the two FETS between turn-off of the UFET and turn-on of the LFET cannot occur in response to a high-to-low transition in the PWM signal.

BRIEF DESCRIPTION OF THE DRAWINGS

FIGS. 4A–4E and 5A–5D are timing diagrams associated with the operation of the DC-DC converter of FIG. 3.

DETAILED DESCRIPTION

Figure 1:
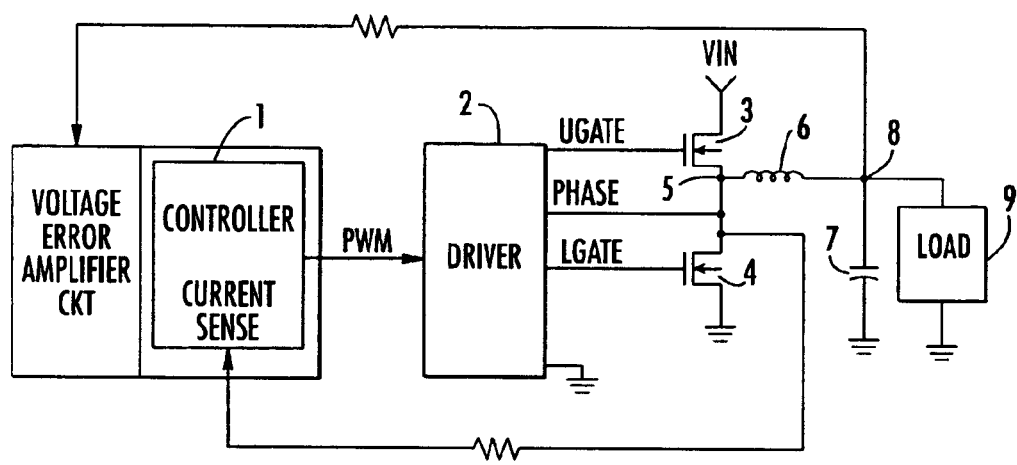
FIG. 1 diagrammatically illustrates the basic architecture of a PWM-based DC-DC converter.
Figure 2:
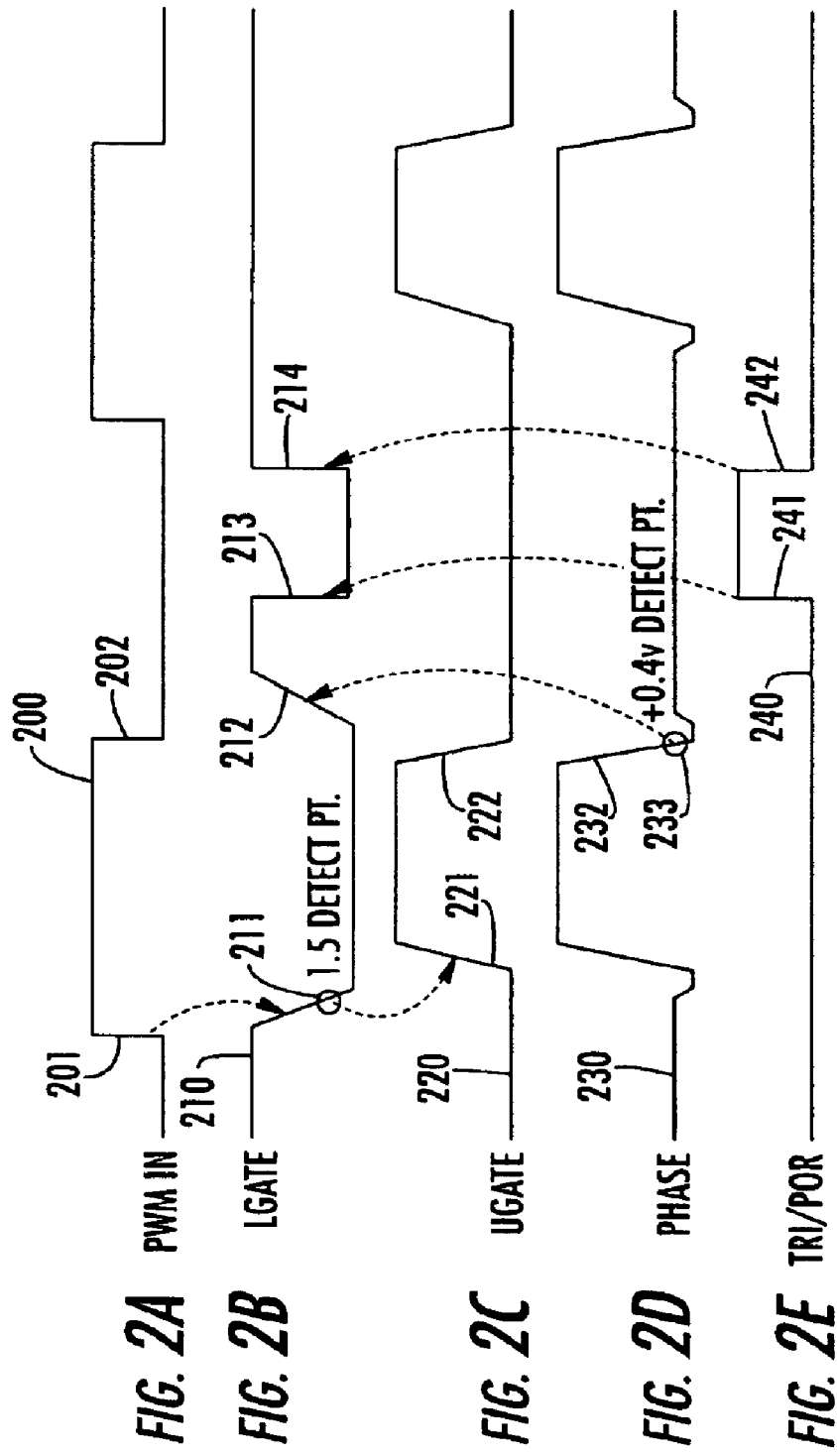
FIGS. 2A–2E contain a set of timing diagrams associated with the operation of the DC-DC converter of FIG. 1.

Before describing in detail the PWM-based DC-DC converter circuit in accordance with the present invention, it should be observed that the invention resides primarily in a prescribed modular arrangement of conventional circuits and components therefor. In a practical implementation that facilitates their being packaged in a hardware-efficient configuration, this arrangement may be readily implemented as a field programmable gate array (FPGA), or application specific integrated circuit (ASIC) chip set. Consequently, the configuration of such arrangement of circuits and components and the manner in which they are interfaced with other electronic circuitry have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Figure 3:
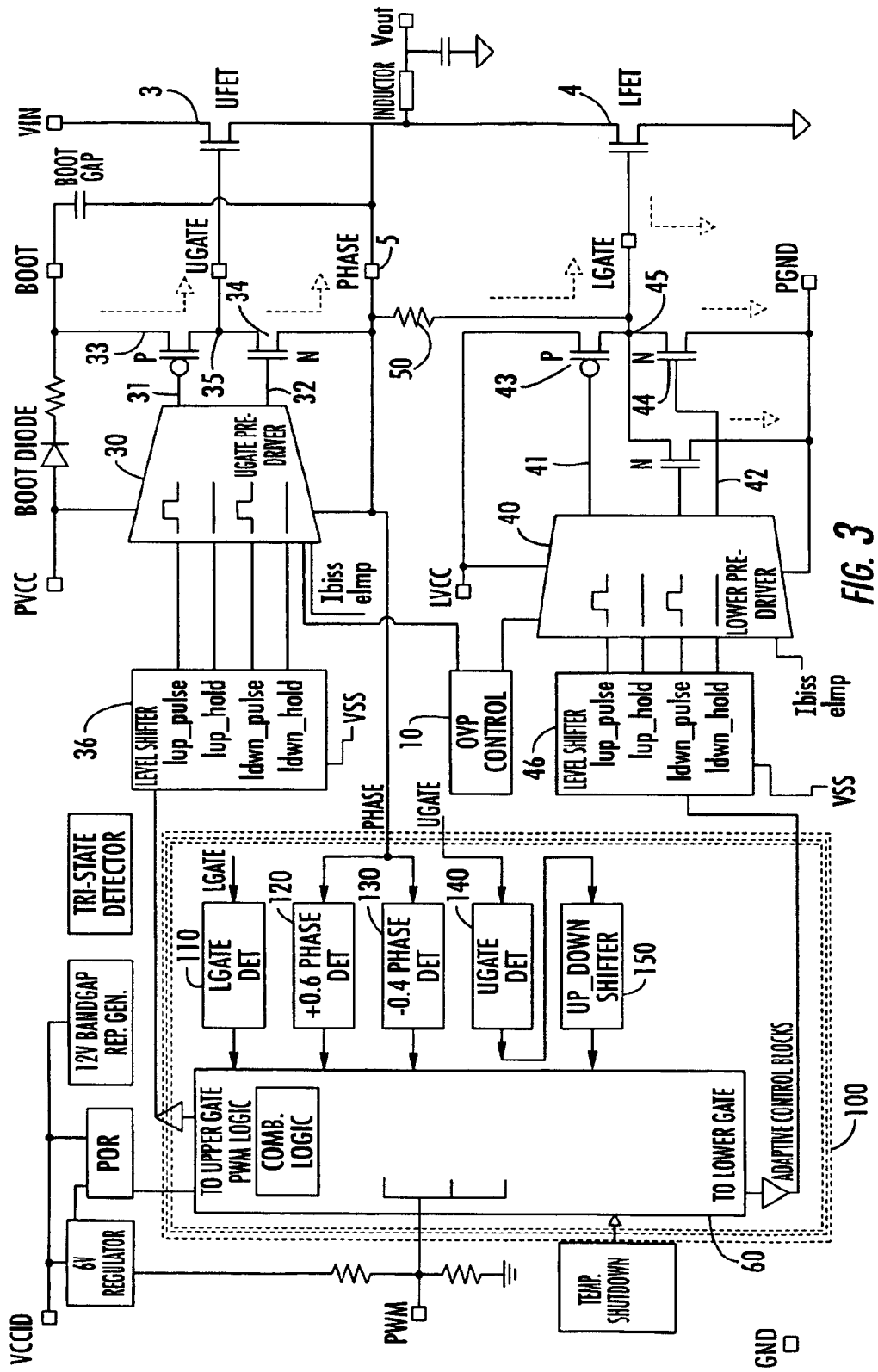
FIG. 3 diagrammatically illustrates a PWM-based, DC-DC converter in accordance with the present invention.

Attention is now directed to FIG. 3, wherein the architecture of a PWM-based DC-DC converter in accordance with the present invention is diagrammatically illustrated. As shown therein, an overvoltage protection (OVP) control circuit 10, to which a power on reset (POR) signal is supplied, is coupled to respective upper and lower pre-driver circuits 30 and 40, that are operative to supply gate drive signals to the upper NFET 3 and to the lower NFET 4. In addition, an overvoltage protection resistor 50 is coupled between the phase node 5 and the LGATE input to the lower NFET 4. The upper pre-driver 30 has first and second output control lines 31 and 32 coupled to the gate drives of a PFET switch 33 and an NFET switch 34, respectively. PFET switch 33 and NFET switch 34 have their source-drain paths coupled in series between an external bootstrap supply node BOOT and PHASE node 5. The common connection 35 of PFET 33 and NFET 34 is coupled as an upper gate drive UGATE to the upper NFET 3.

In a complementary manner, the lower pre-driver 40 has first and second output control lines 41 and 42 coupled to the gate drive of a PFET switch 43 and an NFET switch 44, respectively. PFET switch 43 and NFET switch 44 have their source-drain paths coupled in series between a line voltage supply node LVCC and a power ground (PGND) node. The common connection 45 of PFET 43 and NFET 44 is coupled as a lower gate drive LGATE to the lower NFET 4.

The control inputs to the upper pre-driver 30 are supplied by an upper level shifter 36, control for which is supplied by a set of combinational logic 60 within a dead time controller, shown surrounded by broken lines 100. Similarly, control inputs to the lower pre-driver 40 are supplied by a lower level shifter 46, control for which is also supplied by combinational logic 60 within dead time controller 100. In addition to receiving the PWM signal from an upstream PWM generator, combinational logic 60 is coupled to receive outputs of a set of voltage threshold detectors. These threshold detectors include an LGATE detector 110, which is coupled to monitor the voltage at the LGATE node 45, a +0.8 V PHASE detector 120, which is coupled to monitor the voltage at phase node 5, a −0.4 V PHASE detector 130, which is also coupled to monitor the voltage at phase node 5, a UGATE detector 140, which is coupled to monitor the voltage at the UGATE node 35, and an UP_DOWN SHIFTER 150, which is coupled to the output of the UGATE detector 140.

Operation of the converter of FIG. 3 may be understood by reference to the timing diagrams of FIGS. 4A–4E and 5A–5D. With reference to FIGS. 4A–4E, subsequent to a prescribed blanking delay 410-D (e.g., on the order of 7 ns) following a first low-to-high transition 401 of the PWM signal 400, the lower FET's gate drive signal 410 applied to the LGATE node 45 is caused to transition from high to low, as shown by excursion 411, turning the LFET 4 off. Using this high-to-low transition 411 of the LFET signal as detected by LGATE detector 110 as a reference, the PHASE node voltage (PHASE) is then monitored by phase node detectors 120 and 130 for the occurrence of one of a set of predetermined conditions in order to determine when to turn on the UFET 3. The invention addresses three separate cases that may initiate turn on of UFET 3 by way of the UGATE signal. For each action, there is a built-in precedent blanking delay following detection of the high-to-low transition 411 of the LGATE signal 410.

The first case (Case I), shown by signal trace 420, corresponds to the polarity of the voltage at the PHASE node 5 going negative subsequent to the LGATE node transitioning from high-to-low at 411, referenced above. For this purpose, in response to the LGATE voltage going low at 411, the voltage at the PHASE node 5 is monitored to determine whether it has reached a prescribed negative polarity voltage (e.g., −0.4 V). In particular, following a (7 ns) blanking delay 410-D, if the phase voltage at the PHASE node 5 drops below the −0.4 V threshold as shown at 421, combinational logic 60 triggers a low-to-high to transition on the UGATE, which causes the phase node voltage to go high at 422.

The second case (Case II) shown by signal trace 430 is associated with a reverse current condition, and corresponds to the polarity of the voltage at the PHASE node going positive subsequent to the LGATE node transitioning from high-to-low 411. For this purpose, if Case I is not observed, namely, if the −0.4 V threshold 421 is not reached following the high-to-low transition of the LGATE voltage, combinational logic 60 looks to see whether a prescribed positive threshold (e.g., +0.6 V) has been reached. If so, as shown by threshold 431, combinational logic 60 will trigger a low-to-high transition of the UGATE signal, which causes the phase node voltage to go high, as shown at 432.

The third case (Case III), shown by signal trace 440, and associated with a no load condition, corresponds to the elapse of a prescribed time-out without either of the positive and negative polarity thresholds having been reached at the phase node 5. Namely, if neither the −0.4 V and +0.6 V thresholds described above, is observed at the phase node 5 within a prescribed time out window 440-TO (e.g., 50 ns) after the high-to-low transition 411 in the LGATE signal 410, the combination logic 60 triggers a low-to-high transition of the UGATE signal so that the voltage at the phase node 5 goes high as shown at 441.

From a comparison of the LGATE turn-off transition 411 with the respective UGATE turn-on transitions represented by the phase node voltage traces 422, 432 and 441, it can seen that there is no overlap between the terminal end of the conduction interval for LFET 4 and the initial portion of the conduction interval for the UFET 3. Therefore, there is no simultaneous conduction of these two FETS between the time of turn-off of the LFET and the time of turn-on of the UFET 3 in response to a low-to-high transition in the PWM signal.

The timing diagrams of FIGS. 5A–5C detail the controlled turn-off of UFET 3 and the subsequent turn-on of LFET 4, after a high-to-low transition 501 in the PWM signal 500. In particular, as shown by broken lines 502, turn off of the UGATE drive to UFET 3 is initiated at 511 by the high-to-low transition 501 in the PWM waveform of FIG. 5A. Thereafter the PHASE node and UGATE node are monitored by associated threshold circuits 140–160 within the dead time controller 100. Specifically, in response to the UGATE voltage dropping to a voltage level that is a prescribed value above the phase voltage (e.g., on the order of 1.75 V above the PHASE voltage (−12V)), as shown at 511, a prescribed time out (e.g., 10 ns) is triggered, as shown by broken lines 521, whereupon the LGATE signal 520 is transitioned from low-to-high at 522, turning en the LFET 4.

Alternatively, if the level of the PHASE node voltage 530 reaches a predetermined threshold (e.g., on the order of 0.8 V) as shown at 531, the low-to-high transition of the LGATE voltage is initiated, as shown at 522. As is the case a for a low-to-high transition of the PWM signal, from a comparison of the LGATE turn-on transition 522 with the UGATE turn-off transition 511, it can seen that there is no overlap between the terminal end of the conduction interval for the UFET 3 and the initial portion of the conduction interval for the LFET 4, so that simultaneous conduction of the two FETS between turn-off of the UFET 3 and turn-on of the LFET 4 cannot occur in response to a high-to-low transition in the PWM signal.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A control circuit for a switch mode DC-DC converter comprising an arrangement of LGATE, UGATE and PHASE node condition threshold detectors, said LGATE condition threshold detector being operative to monitor the gate (LGATE) of a lower FET (LFET), said UGATE condition threshold detector being operative to monitor the gate (UGATE) of an upper FET (UFET), and said PHASE node condition threshold detector being operative to monitor a phase node voltage at a PHASE node or common node between said UFET and said LFET, voltage outputs of said threshold detectors being processed in accordance with a switching control operator to ensure that each of said UFET and said LFET is completely turned off before the other FET begins conduction, thereby maintaining a dead time that exhibits no shoot-through current and is independent of type of switching FET, and wherein said switching control operator is operative to trigger turn-on of said UFET, which causes the phase node voltage to increase from a first voltage level to a second voltage level higher than said first voltage level, in response to turn-off of said LFET, and in response to said phase node voltage at said PHASE node having reached a prescribed negative polarity voltage threshold following a predetermined blanking delay subsequent to said turn-off of said LFET.

2. The control circuit according to claim 1, wherein said switching control operator is operatives, in response to said PHASE node not having reached said prescribed negative polarity voltage following said predetermined blanking delay subsequent to turn-off of said LFET, to monitor whether said phase node voltage has increased from said first voltage level to a prescribed positive polarity voltage threshold and, in response to said phase node voltage having increased from said first voltage level to said prescribed positive polarity voltage threshold, said switching control operator is operative to trigger turn-on of said UFET, and thereby causing said phase node voltage to increase to said second voltage level.

3. The control circuit according to claim 2, wherein said switching control operator is operative, in response to an elapse of a prescribed time-out without either of said prescribed positive and negative polarity voltage thresholds having been reached at said phase node following said blanking delay, to trigger turn-on of said LFET, causing said phase node voltage to increase from said first voltage level to said second voltage level.

4. The control circuit according to claim 1, wherein said switching control operator is operative, in response to turn-off of said UFET, and in response to a UGATE voltage at said UGATE dropping to a voltage level that is a prescribed value above said phase node voltage, to trigger a prescribed time out and then turn on said LFET in response to expiration of said prescribed time out.

5. The control circuit according to claim 1, wherein said switching control operator is operative, in response to turn-off of said UFET, and in response to said phase node voltage reaching a predetermined threshold voltage, to turn on said LFET.

6. A method for controlling a switch mode DC-DC converter comprising an upper FET (UFET), having an upper gate (UGATE), and a lowar FET (LFET) having a lower gate (LGATE), said UFET and said LFET being coupled between power supply voltage rails, and having a common node or PHASE node therebetween, said method comprising the steps of:

(a) monitoring an LGATE voltage, a UGATE voltage and a phase node voltage; and (b) in response to turn-off of said LFET, and in response to said phase node voltage at said PHASE node having reached a prescribed negative polarity voltage threshold following a predetermined blanking delay subsequent to said turn-off of said LFET, triggering turn-on of said UFET, thereby causing said phase node voltage to increase from a first voltage level to a second voltage level higher than said first voltage level.

7. The method according to claim 6, wherein step (b) further comprises, in response to said PHASE node not having reached said prescribed negative polarity voltage following said predetermined blanking delay subsequent to turn-off of said LFET, monitoring whether said phase node voltage has increased from said first voltage level to a prescribed positive polarity voltage threshold and, in response to said phase node voltage having increased from said first voltage level to said prescribed positive polarity voltage threshold, triggering turn-on of said UFET, thereby causing said phase node voltage to increase to said second voltage level.

8. The method circuit according to claim 7, wherein step (b) further comprises, in response to an elapse of a prescribed time-out without either of said prescribed positive and negative polarity voltage thresholds having been reached at said phase node following said blanking delay, triggering turn-on of said UFET, thereby causing said phase node voltage to increase from said first voltage level to said second voltage level.

* * * * *